US010524254B2

(12) United States Patent
Song et al.

(10) Patent No.: US 10,524,254 B2
(45) Date of Patent: Dec. 31, 2019

(54) BASE STATION MANAGEMENT SYSTEM AND METHOD IN NEXT GENERATION MOBILE COMMUNICATION SERVICE

(71) Applicant: KT Corporation, Seongnam-si, Gyeonggi-do (KR)

(72) Inventors: Hyung-Joon Song, Seoul (KR); Won-Yeol Lee, Seoul (KR)

(73) Assignee: KT Corporation, Seongnam-si (KR)

(*) Notice: Subject to any disclaimer, the term of this patent is extended or adjusted under 35 U.S.C. 154(b) by 0 days.

(21) Appl. No.: 15/666,125

(22) Filed: Aug. 1, 2017

(65) Prior Publication Data
US 2018/0042007 A1 Feb. 8, 2018

(30) Foreign Application Priority Data
Aug. 2, 2016 (KR) .......................... 10-2016-0098419

(51) Int. Cl.
*H04B 10/00* (2013.01)
*H04W 72/04* (2009.01)
*H04B 7/024* (2017.01)
*H04B 7/06* (2006.01)
*H04B 10/2575* (2013.01)
(Continued)

(52) U.S. Cl.
CPC ........ *H04W 72/0433* (2013.01); *H04B 7/024* (2013.01); *H04B 7/0456* (2013.01); *H04B 7/0617* (2013.01); *H04B 10/25753* (2013.01); *H04B 10/25754* (2013.01);
(Continued)

(58) Field of Classification Search
CPC ............. H04W 88/08; H04W 72/0433; H04W 72/042; H04W 88/02; H04W 16/02; H04W 88/085; H04L 45/245; H04L 5/0053; H04L 47/781; H04B 10/25753; H04B 7/0617;
(Continued)

(56) References Cited

U.S. PATENT DOCUMENTS

| 6,002,935 A | * | 12/1999 | Wang | H04W 16/02 455/446 |
| 2002/0001296 A1 | * | 1/2002 | Lee | H04L 1/0066 370/338 |
| 2003/0043857 A1 | * | 3/2003 | Takagi | H04J 3/1694 370/503 |
| 2009/0180426 A1 | * | 7/2009 | Sabat | H04W 88/085 370/328 |

(Continued)

FOREIGN PATENT DOCUMENTS

| JP | 2007-174123 A | 7/2007 |
| KR | 10-2013-0065019 A | 6/2013 |

(Continued)

*Primary Examiner* — Don N Vo
(74) *Attorney, Agent, or Firm* — Sughrue Mion, PLLC

(57) ABSTRACT

A system for managing a base station in a next generation mobile communication service includes a plurality of remote base stations configured to provide data transmission to a plurality of user terminals in a next generation mobile communication system; a centralized base station configured to perform interlocking among the plurality of remote base stations and perform resource allocation and scheduling for each user terminal; and a remote interlocking element configured to transmit corresponding control and data information to the plurality of remote base stations according to beamforming information and resource allocation information allocated by the centralized base station, and transmit channel information of a user terminal, which is received from the plurality of remote base stations, to the centralized base station.

21 Claims, 8 Drawing Sheets

(51) Int. Cl.
*H04L 12/709* (2013.01)
*H04J 14/02* (2006.01)
*H04B 7/0456* (2017.01)
*H04L 12/911* (2013.01)
*H04W 88/08* (2009.01)

(52) U.S. Cl.
CPC ........ *H04J 14/0282* (2013.01); *H04L 45/245* (2013.01); *H04L 47/781* (2013.01); *H04W 88/085* (2013.01)

(58) Field of Classification Search
CPC .................. H04B 7/024; H04B 7/0456; H04B 10/25754; H04J 14/0282
USPC .......................................................... 398/115
See application file for complete search history.

(56) References Cited

U.S. PATENT DOCUMENTS

| | | | | |
|---|---|---|---|---|
| 2013/0148596 | A1* | 6/2013 | Shin | H04W 72/04 370/329 |
| 2013/0336299 | A1* | 12/2013 | Lee | H04L 5/0007 370/336 |
| 2014/0044084 | A1* | 2/2014 | Lee | H04L 1/1861 370/329 |
| 2015/0305041 | A1* | 10/2015 | Kim | H04W 72/085 370/329 |
| 2016/0242125 | A1* | 8/2016 | Lee | H04W 52/246 |

FOREIGN PATENT DOCUMENTS

| | | |
|---|---|---|
| KR | 10-2013-0118803 A | 10/2013 |
| KR | 10-2015-0016632 A | 2/2015 |
| KR | 10-2015-0041015 A | 4/2015 |
| WO | 2014/019636 A1 | 2/2014 |

* cited by examiner

BASE STATION MANAGEMENT SYSTEM AND METHOD IN NEXT GENERATION MOBILE COMMUNICATION SERVICE

CROSS-REFERENCE TO RELATED APPLICATION

This application claims priority from Korean Patent Application No. 10-2016-0098419 filed in the Korean Intellectual Property Office on Aug. 2, 2016, the disclosure of which is incorporated herein in its entirety by reference.

FIELD

Systems and methods consistent with exemplary embodiments relate to managing a base station in a next generation mobile communication service, and particularly, to managing a base station in a next generation mobile communication service, which can provide a high-speed data transmission speed through a medium frequency and an ultra high frequency in a next generation mobile communication system and secure coverage.

BACKGROUND

Wireless mobile communication can enhance a maximum data rate which can be provided through a frequency bandwidth, multiple antennas, an interference cancellation technique, and the like.

It is expected that the wireless mobile communication will evolve in a way to greatly increase a bandwidth by using a medium frequency and an ultra high frequency, instead of a frequency band that is currently used, and thus to greatly enhance the data rate by utilizing antennas which are several times to several tens of times larger than the data rate of current wireless mobile communication.

Since an interval at which the antennas interfere with each other becomes shorter when a transmission frequency band becomes higher, the number of antennas per unit area may be greatly increased, and as a result, synergy may be generated to enhance the data rate.

However, since linearity of an electromagnetic wave becomes stronger when the transmission frequency band becomes higher, and as a result, reflection, diffraction, and dispersion may be weakened. Therefore, there may be a challenge to secure the coverage compared with a current wireless mobile communication base station.

That is, when the current wireless mobile communication base station is installed in a specific region, a terminal may receive a radio signal at a predetermined level or higher even in a region which a base station antenna does not directly face through the reflection, the diffraction, and the dispersion of the electromagnetic wave in non line-of-sight (NLOS). However, as the transmission frequency band becomes higher, the strength of the received radio signal is drastically reduced.

In general, when the number of antennas of the base station increases, the quality of the received signal of the terminal is enhanced and when a plurality of independent data may be simultaneously transmitted and received, and as a result, the data rate is enhanced. However, when the transmission frequency band becomes higher, the linearity of the electromagnetic wave is enhanced, and as a result, the quality of the received signal in the terminal is further enhanced, but spatial multiplexing using multiple ranks to transmit the plurality of independent data becomes difficult.

SUMMARY

One or more exemplary embodiments provide a system and a method for managing a base station in a next generation mobile communication service, which can provide a high-speed data transmission speed through a medium frequency and an ultra high frequency in the next generation mobile communication system and secure coverage.

According to an aspect of an exemplary embodiment, there is provided a system for managing a base station in a next generation mobile communication service, the system including: a plurality of remote base stations configured to provide data transmission to a plurality of user terminals in a next generation mobile communication system; a centralized base station configured to perform interlocking among the plurality of remote base stations and perform resource allocation and scheduling for each user terminal; and a remote interlocking element configured to transmit corresponding control and data information to the plurality of remote base stations according to beamforming information and resource allocation information allocated by the centralized base station, and transmit channel information of a user terminal, which is received from the plurality of remote base stations, to the centralized base station.

The plurality of remote base stations may be positioned at one place to accommodate the plurality of user terminals in one region.

The plurality of remote base stations may be positioned in a plurality of regions to extend coverage.

When the remote interlocking element receives at least two first data flows from at least two remote base stations among the plurality of remote base stations, the remote interlocking element may aggregate the at least two first data flows into one flow of output data, and transmit the output data to the centralized base station. When the remote interlocking element receives synthesized input data, which is a result of synthesis of at least two second data flows, from the centralized base station, the remote interlocking element may restore the synthesized input data to the at least two second data flows, and transmit the synthesized input data to corresponding remote base stations according to subframe numbers in the respective restored data flows.

The centralized base station may include a central interlocking element configured to receive output data, which is a result of synthesis of at least two first data flows, from the remote interlocking element and restore the output data to the at least two first data flows, and allow the centralized base station to recognize the at least two first data flows. The central interlocking element may further aggregate and synthesize at least two second data flows to be transmitted to at least two connected remote base stations and transmit aggregated and synthesized data to the remote interlocking element connected to the at least two connected remote base stations.

Each of the plurality of remote base stations may include an optical element, the optical element being allocated with a unique optical wavelength and configured to transmit and/or receive a corresponding wavelength. The centralized base station may include a multi-wavelength optical element configured to transmit signals of a plurality of wavelengths to transmit and/or receive control and data signals to and/or from the plurality of remote base stations. When the remote interlocking element receives the signals of the plurality of wavelengths from the multi-wavelength optical element, the remote interlocking element may amplify a signal of a wavelength corresponding to each remote base station, attenuate signals of remaining wavelengths, and transmit the signal to a corresponding remote base station.

A wavelength of downlink from the centralized base station to the plurality of remote base stations may be different from a wavelength of uplink from the plurality of remote base stations to the centralized base station.

Each of the plurality of remote base stations may include an optical element, the optical element being allocated with a unique optical wavelength and configured to transmit and/or receive a corresponding wavelength. The remote interlocking element may include a multi-wavelength optical element configured to transmit and/or receive data in a wavelength corresponding to each remote base station to transmit and/or receive the control and data signals to and/or from the plurality of remote base stations.

A wavelength of downlink from the remote interlocking element to the plurality of remote base stations may be different from a wavelength of uplink from the plurality of remote base stations to the remote interlocking element.

The plurality of remote base stations may perform beamforming by using an integrated beamforming codebook based on a beamforming codebook and an inter-base station interlocking codebook.

The plurality of remote base stations may perform the beamforming by using the integrated beamforming codebook according to Equation 1 as below:

$$C = C_C \otimes C_R, \quad \text{(Equation 1)}$$

wherein $C_C$ represents an inter-remote base station interlocking codebook, $C_R$ represents the beamforming codebook of a remote base station, and $\otimes$ represents a Kronecker product symbol.

According to an aspect of an exemplary embodiment, there is provided a method for managing a base station in a next generation mobile communication service, the method including operations: (A) performing, by a centralized base station, interlocking among a plurality of remote base stations and performing resource allocation and scheduling for each user terminal; (B) transmitting, by a remote interlocking element, corresponding control and data information to the plurality of remote base stations according to beamforming information and resource allocation information allocated by the centralized base station; (C) providing, by the plurality of remote base stations, data transmission to a plurality of user terminals in a next generation mobile communication system according to the control and data information transmitted by the remote interlocking element; and (D) transmitting, by the remote interlocking element, channel information of a user terminal, which is received from the plurality of remote base stations, to the centralized base station.

Operation (D) may include (D-1) receiving, by the remote interlocking element, at least two first data flows from at least two remote base stations among the plurality of remote base stations, (D-2) aggregating, by the remote interlocking element, the at least two first data flows into one flow of output data, and (D-3) transmitting, by the remote interlocking element, the output data to the centralized base station.

In operation (A), the centralized base station may perform interlocking with the plurality of remote base stations by using signals of a plurality of wavelengths to transmit and/or receive control and data signals to and/or from the plurality of remote base stations. In operation (B), when the remote interlocking element receives the signals of the plurality of wavelengths from a multi-wavelength optical element of the remote interlocking element, the remote interlocking element may amplify a signal of a wavelength corresponding to each remote base station, attenuate signals of remaining wavelengths, and transmit the corresponding control and data information to a corresponding remote base station.

In operation (B), the remote interlocking element may transmit and/or receive control and data signals to and/or from the plurality of remote base stations in a wavelength corresponding to each remote base station.

The plurality of remote base stations may perform beamforming by using an integrated beamforming codebook based on a beamforming codebook and an inter-base station interlocking codebook.

The plurality of remote base stations may perform the beamforming by using the integrated beamforming codebook according to Equation 1 as below:

$$C = C_C \otimes C_R, \quad \text{(Equation 1)}$$

wherein $C_C$ represents an inter-remote base station interlocking codebook, $C_R$ represents the beamforming codebook of a remote base station, and $\otimes$ represents a Kronecker product symbol.

According to an aspect of an exemplary embodiment, there is provided a base station that performs interlocking with a plurality of remote base stations and allocates resources among the plurality of remote base stations, the base station including: a transceiver configured to transmit and/or receive control and data signals to and/or from the plurality of remote base stations; and a central interlocking element configured to perform at least one of: receiving output data, which is a result of synthesis of at least two first data flows from two or more remote base stations, and restoring the output data to the at least two first data flows; and aggregating and synthesizing at least two second data flows to be transmitted to the two or more remote base stations.

BRIEF DESCRIPTION OF THE DRAWINGS

These and/or other aspects of the disclosure will become apparent and more readily appreciated from the following description of the exemplary embodiments, taken in conjunction with the accompanying drawings.

DETAILED DESCRIPTION

Figure 1:
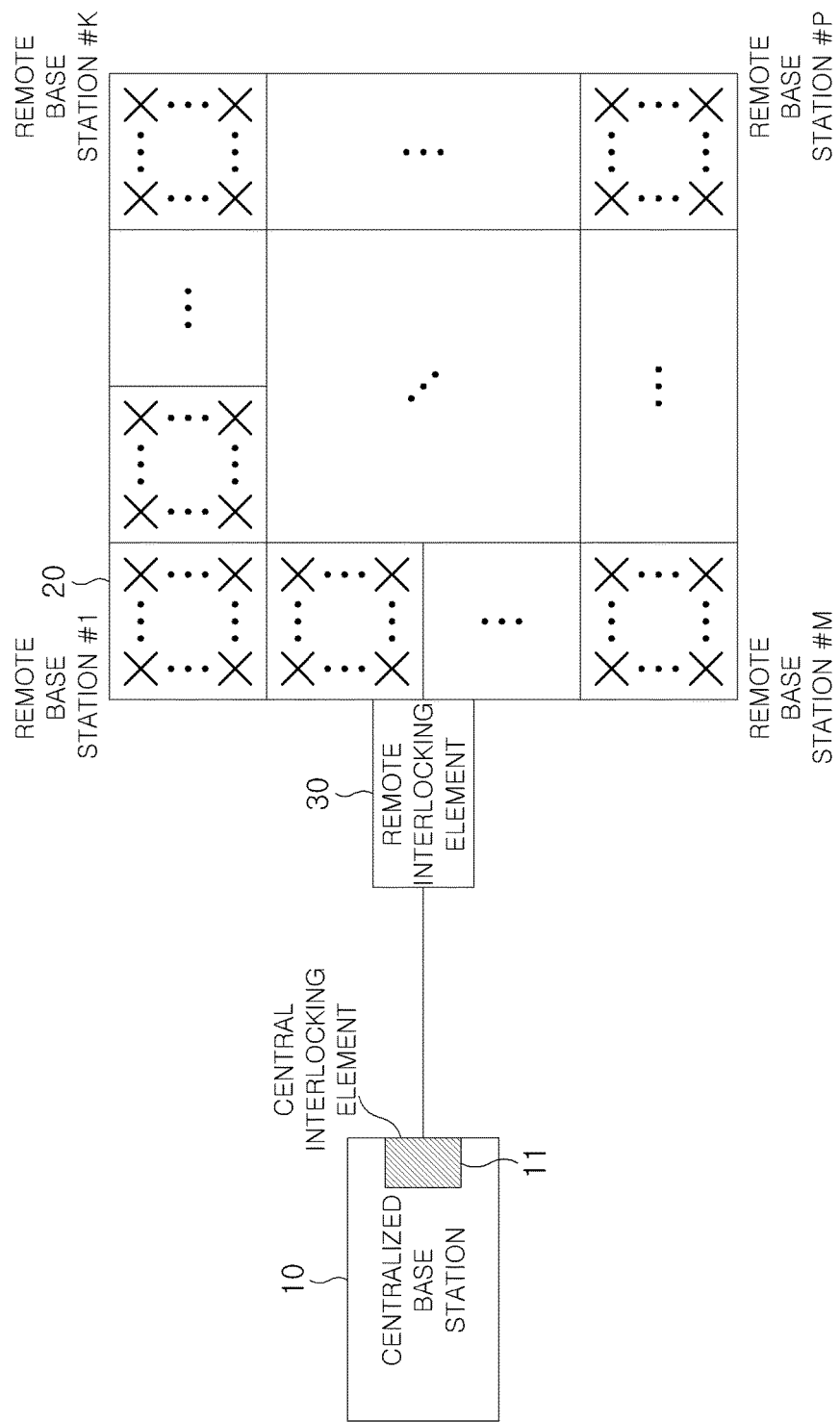
FIG. 1 is a configuration diagram of a system for managing a base station in a next generation mobile communication service according to an exemplary embodiment.

As the inventive concept allows for various changes and numerous exemplary embodiments, particular exemplary embodiments will be illustrated in the drawings and described in detail in the written description. However, this is not intended to limit the disclosure to particular modes of practice, and it is to be appreciated that all modifications, equivalents, and/or alternatives that do not depart from the spirit and technical scope of the disclosure are encompassed in the inventive concept.

First, terms used in the disclosure are only used to describe a specific exemplary embodiment and do not intend to limit the disclosure and a singular expression may include a plural expression as long as it is not apparently contextually different. Further, in the disclosure, it should be understood that the term "include" or "have" indicates that a feature, a number, a step, an operation, a component, a part or the combination thereof described in the specification is present, but does not exclude a possibility of presence or addition of one or more other features, numbers, steps, operations, components, parts or combinations thereof, in advance.

In the following description, a detailed explanation of related known configurations or functions may be omitted to avoid obscuring the subject matter.

In wireless communication, when a medium and an ultra high frequency are used, a beam of an electromagnetic wave is formed to be narrow and long. That is, the directivity of the beam is increased and the concentration of electric power in the corresponding direction is increased. As a result, since the strength of a signal transmitted to a terminal is increased, a wireless data rate may be increased. However, beams transmitted by an antenna of a base station using the medium frequency and the ultra high frequency are reflected and diffracted in a building or an obstacle, and as a result, it is difficult for a terminal to receive the beams. Therefore, there is a disadvantage in that spatial multiplexing (SM) transmission may not be used, which increases a data transmission rate of a terminal in multiple-input multiple-output (MIMO). Thus, current single base station structure based medium and ultra high frequency technology may be limited to a purpose of providing a service to a plurality of users in a line-of-sight (LOS) region.

In order to solve the problem described above, a structure of a flexible network and a configuration of a device, which are capable of enhancing a capacity of a cell or extending coverage, are desirable.

FIG. 1 is a configuration diagram of a system for managing a base station in a next generation mobile communication service according to an exemplary embodiment.

Referring to FIG. 1, the system for managing a base station in a next generation mobile communication service according to an exemplary embodiment includes a centralized base station 10, a plurality of remote base stations 20, and a remote interlocking element 30. The plurality of remote base stations 20 include a remote base station #1, a remote base station #M, a remote base station #K, and a remote base station #P.

The centralized base station 10 includes a central interlocking element 11 and the central interlocking element 11 has the same function as the remote interlocking element 30, but processes data in a manner reverse to a data processing procedure of the remote interlocking element 30.

The centralized base station 10 performs interlocking among a single, a plurality of, and/or all of remote base stations 20 and resource allocation and scheduling for each user. The centralized base station 10 may further include a transceiver (not shown) that transmits and/or receives control and data signals to and/or from the plurality of remote base stations 20.

The central interlocking element 11 receives output data transmitted from the remote interlocking element 30 and restores the output data to a data flow before being synchronized by the remote interlocking element 30 and provides the restored data flow to the centralized base station 10 to enable data to be exchanged between the centralized base station 10 and the remote base station 20.

On the other hand, the central interlocking element 11 aggregates data to be transmitted to the remote base stations 20 connected to the remote interlocking element 30 and transmits the aggregated data to the remote interlocking element 30.

In an exemplary embodiment, the remote base station 20 may have a number of antennas for supporting a data rate which may be maximally provided to one user and the resulting system configuration in the next generation mobile communication system.

In such a configuration, the remote base stations 20 may constitute a cloud base station system.

Herein, the cloud base station system represents a system in which a plurality of remote base stations 20 are collected in one place based on positions of the remote base stations 20. In the cloud base station system, the respective remote base stations 20 manage cells allocated thereto.

The cloud base station system may perform integrated cell functions which are difficult to implement among normal remote base stations 20 which are distant from each other in terms of a distance and/or a position.

In the cloud base station system, an internal primitive with radio resource control (RRC) and media access control (MAC) which are internal protocols of the base station and the RRC and the MAC which are the internal protocols of the other base station is defined to implement inter-base station cooperation communication such as cooperative multi point (CoMP), carrier aggregation, and inter-cell interference coordination (ICIC).

The internal primitive is used without using an X2 interface, and as a result, the cloud base station system may rapidly and efficiently implement functions.

The remote interlocking element 30 is connected to the remote base stations 20 through an optical fiber and connected to the centralized base station 10 through the optical fiber.

The remote interlocking element 30 collects the data transmitted from the remote base stations 20 and aggregates the collected data and transmits the aggregated data to the centralized base station 10.

The remote interlocking element 30 receives the aggregated data transmitted from the centralized base station 10, restores the aggregated data to a data flow before aggregation, and transmits the integrated data to the corresponding remote base station 20 according to a subframe number in the respective restored data flows.

The remote interlocking element 30 transmits corresponding control and data information to the remote base station 20 according to beamforming information, resource allocation information, and the like allocated in the centralized base station 10 and transmits channel information of a user terminal, which is received from the remote base station 20, and the like to the centralized base station 10.

Herein, the remote interlocking element 30 may be an independent device from the centralized base station 10 and installed at the physically same position as the centralized base station 10 or installed at the remote base station 20 side.

In such a configuration, a plurality of remote base stations 20 may be constructed at one place in order to accommodate a plurality of user terminals in one region. For example, one place means one building or one steel tower.

When the remote base station 20 is present in a remote distance from the centralized base station 10 as described above, the remote interlocking element 30 and the centralized base station 10 are connected to each other through the optical fiber in the middle to substantially reduce the quantity of optical fibers.

Figure 2:
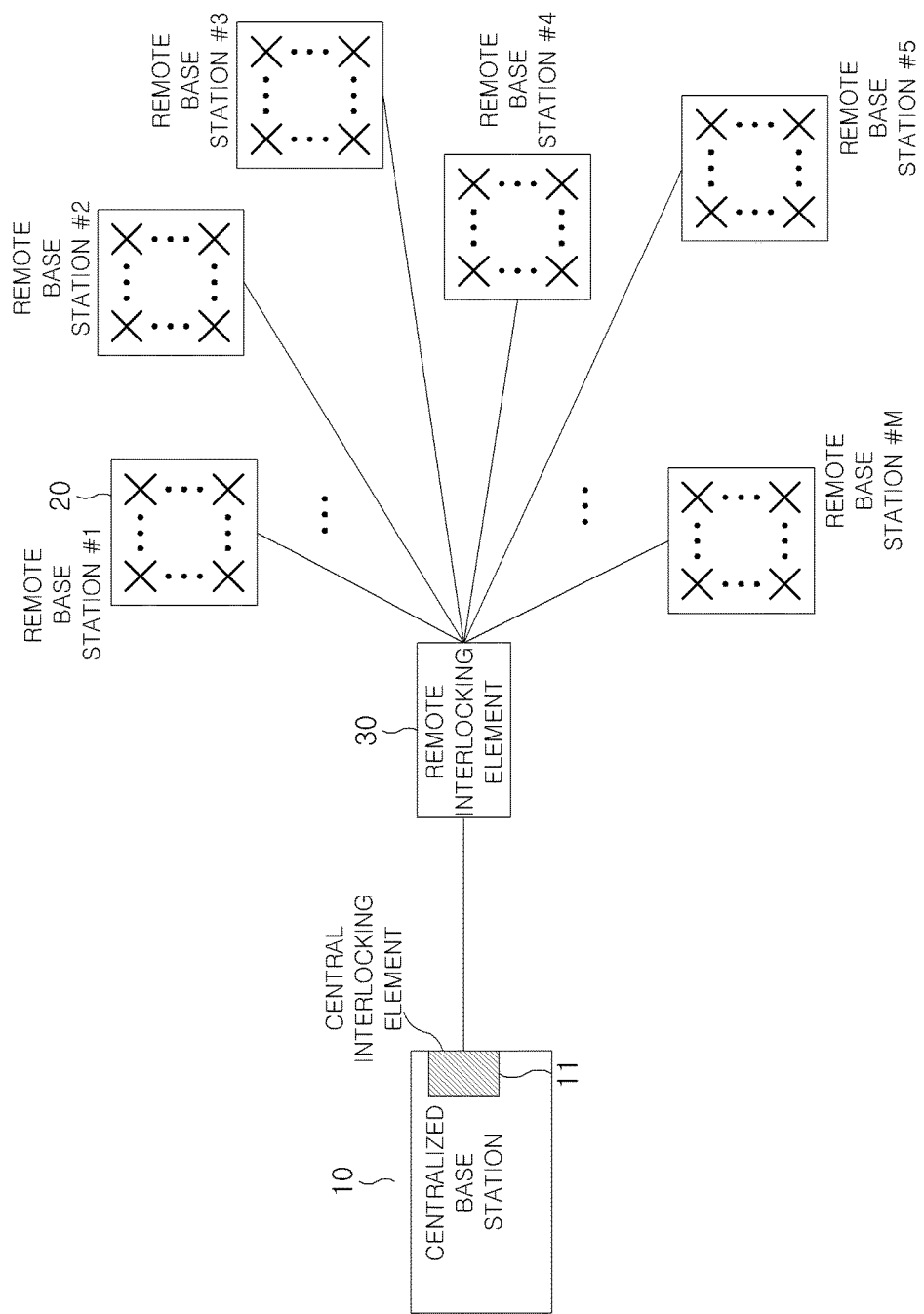
FIG. 2 is a configuration diagram of a system for managing a base station in a next generation mobile communication service according to another exemplary embodiment.

FIG. 2 is a configuration diagram of a system for managing a base station in a next generation mobile communication service according to another exemplary embodiment.

Referring to FIG. 2, the system for managing a base station in a next generation mobile communication service according to another exemplary embodiment includes a centralized base station 10, a plurality of remote base stations 20, and a remote interlocking element 30. The plurality of remote base stations 20 include a remote base station #1, a remote base station #2, a remote base station #3, a remote base station #4, a remote base station #5, and a remote base station #M.

The system for managing a base station in a next generation mobile communication service of FIG. 2 is different from the system of FIG. 1 in that the remote base station 20 is separated (e.g., that the remote base stations 20 are installed in a plurality of regions in order to extend the coverage). The system of FIG. 2 is similar to the system of FIG. 1 in the remaining functions and configurations. Herein, the a plurality of points represent a case where an installation point is not one building or one steel tower. Therefore, since the function and an operation of the system in FIG. 2 are substantially the same as those of FIG. 1, a repeated description thereof will be omitted.

Figure 3:
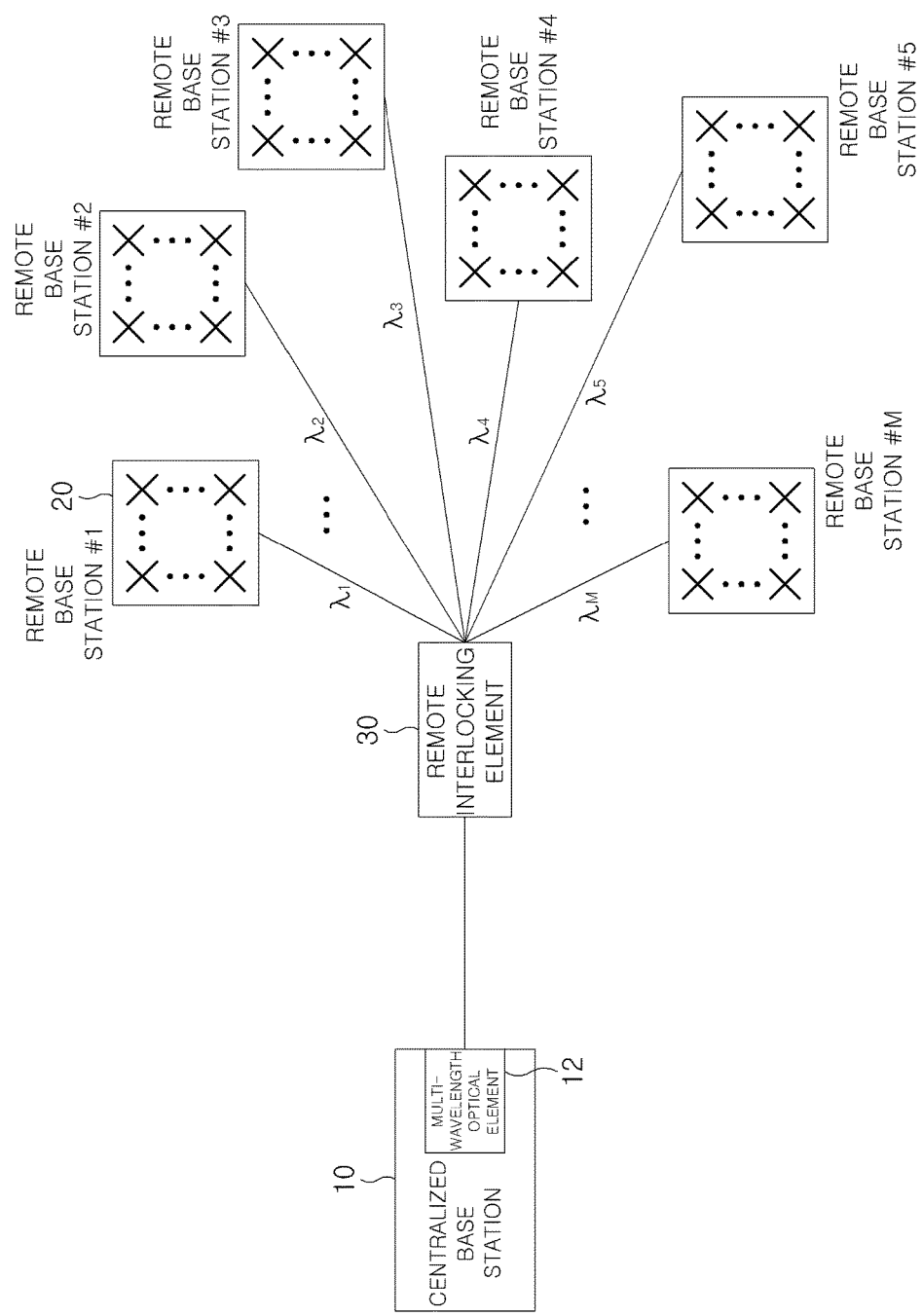
FIG. 3 is a configuration diagram of a system for managing a base station in a next generation mobile communication service according to still another exemplary embodiment.

FIG. 3 is a configuration diagram of a system for managing a base station in a next generation mobile communication service according to still another exemplary embodiment.

Referring to FIG. 3, the system for managing a base station in a next generation mobile communications service according to still another exemplary embodiment includes a centralized base station 10, a plurality of remote base stations 20, and a remote interlocking element 30.

The centralized base station 10, the remote interlocking element 30, and the remote base stations 20 are connected to each other through an optical cable.

Each remote base station 20 has an optical element (not illustrated) that may be allocated with a unique optical wavelength and may transmit and/or receive a corresponding wavelength (e.g., one of $\lambda_1$, $\lambda_2$, $\lambda_3$, $\lambda_4$, $\lambda_5$, . . . $\lambda_M$) and the centralized base station 10 has a multi-wavelength optical element 12 that transmits signals of some or all of wavelengths $\lambda_1$ to $\lambda_M$ and is capable of transmitting and/or receiving control and data signals to and/or from all of the remote base stations 20.

The remote interlocking element 30 may amplify a downlink (DL) optical signal according to a distance from the remote base station 20 and amplify uplink (UL) signals of a plurality of terminals from the remote base station 20 according to the distance between the remote interlocking element 30 and the centralized base station 20.

In particular, when the remote interlocking element 30 receives the signals of wavelengths $\lambda_1$ to $\lambda_4$ from the multi-wavelength optical element 12, the remote interlocking element 30 amplifies the signal of the wavelength corresponding to each remote base station 20 and attenuates the signals of other wavelengths and transmits the attenuated signal to the corresponding remote base station 20.

Since the function and the operation of the system for managing a base station in a next generation mobile communication service in FIG. 3 are substantially the same as those in FIG. 1, a repeated description thereof will be omitted.

Figure 4:
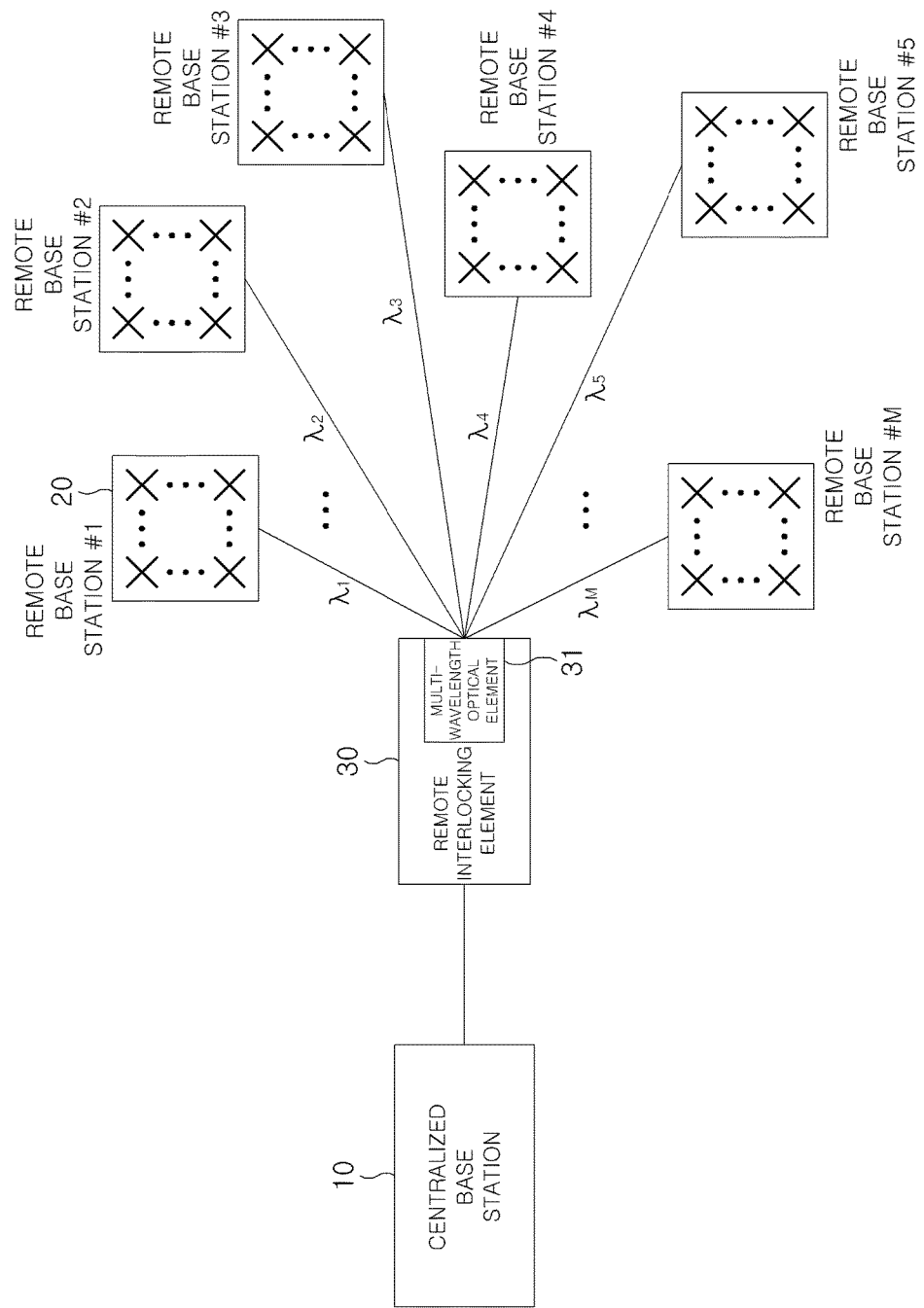
FIG. 4 is a configuration diagram of a system for managing a base station in a next generation mobile communication service according to still another exemplary embodiment.

FIG. 4 is a configuration diagram of a system for managing a base station in a next generation mobile communication service according to still another exemplary embodiment.

Referring to FIG. 4, the system for managing a base station in a next generation mobile communication service according to still another exemplary embodiment includes a centralized base station 10, a plurality of remote base stations 20, and a remote interlocking element 30.

The remote base station 20 and the remote interlocking element 30 are connected to each other through the optical cable.

The centralized base station 10 and the remote interlocking element 30 may be connected to each other through the optical cable or a unshielded twisted pair (UTP) based Ethernet network according to a base station configuration.

Each remote base station 20 has an optical element (not illustrated) that may be allocated with a unique optical wavelength and transmit and/or receive the corresponding wavelength (e.g., one of $\lambda_1$ to $\lambda_4$) and the remote interlocking element 30 has a multi-wavelength optical element 31 that may transmit and/or receive data in the wavelength corresponding to each remote base station 20 so as to transmit and/or receive control and data signals to and/or from all remote base stations 20.

Since the function and the operation of the system for managing a base station in a next generation mobile communication service in FIG. 4 are substantially the same as those in FIG. 1, a repeated description thereof will be omitted.

Figure 5:
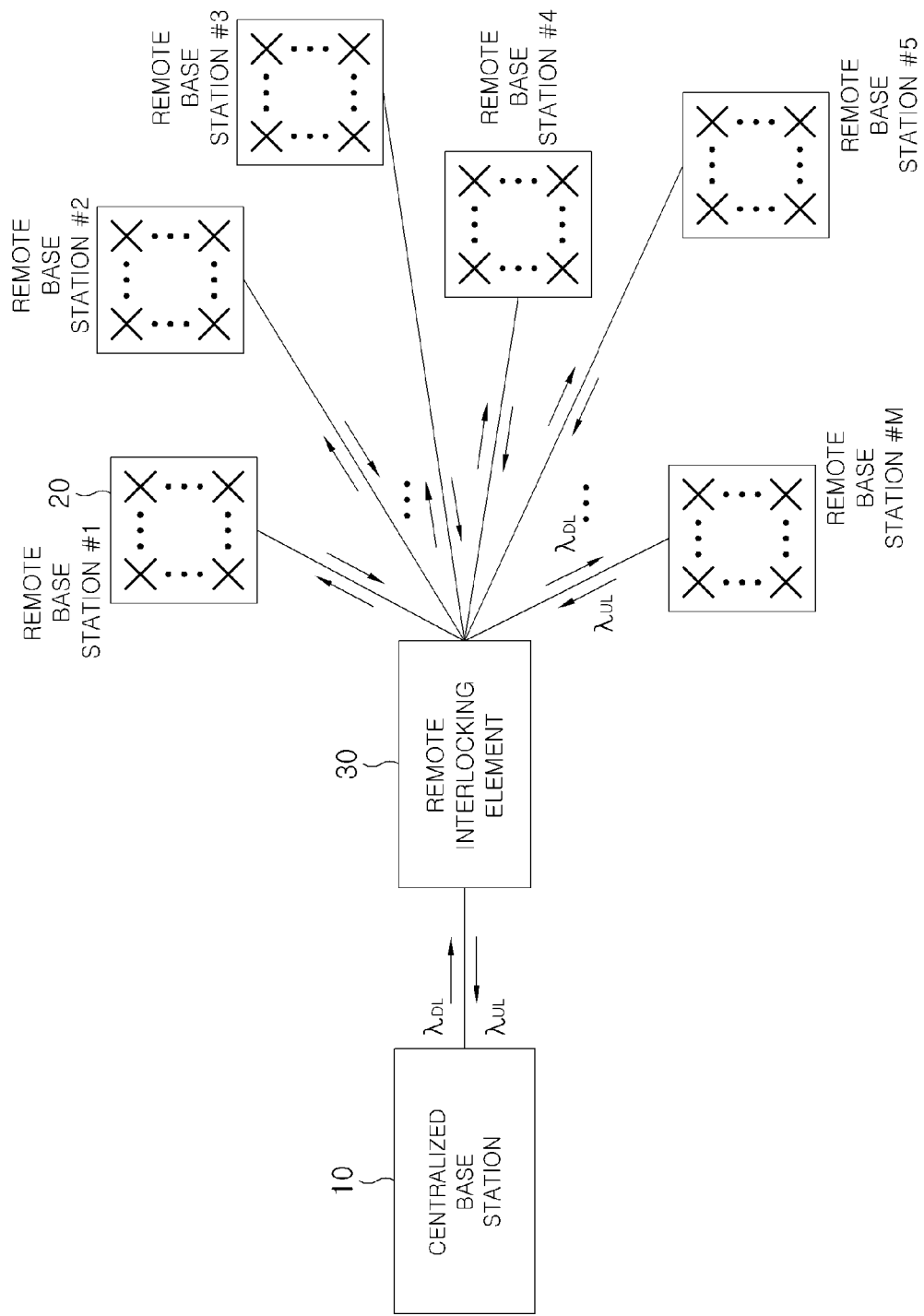
FIG. 5 is a configuration diagram of a system for managing a base station in a next generation mobile communication service according to still another exemplary embodiment.

FIG. 5 is a configuration diagram of a system for managing a base station in a next generation mobile communication service according to still another exemplary embodiment.

Referring to FIG. 5, the system for managing a base station in a next generation mobile communication service according to still another exemplary embodiment includes a centralized base station 10, a plurality of remote base stations 20, and a remote interlocking element 30. In the exemplary embodiment of FIG. 0.5, when the centralized base station 10 and the remote base stations 20 interlock with each other, the optical wavelength is allocated for each of uplink (UL) and downlink (DL).

The centralized base station 10, the remote interlocking element 30, and the remote base stations 20 are connected to each other through the optical cable.

The centralized base station 10 selects the remote base station 20 to interlock with a user terminal and transmits beamforming information and data information of each remote base station 20 through a downlink optical wavelength $\lambda_{DL}$, and each remote base station 20 receives and transmits the corresponding information from an allocated subframe.

The information received from the user terminal is transmitted to the centralized base station 10 in an uplink optical wavelength $\lambda_{UL}$ through an uplink subframe allocated by each remote base station 20.

Since the function and the operation of the system for managing a base station in a next generation mobile communication service in FIG. 5 are substantially the same as those in FIG. 3, a repeated description thereof will be omitted.

Figure 6:
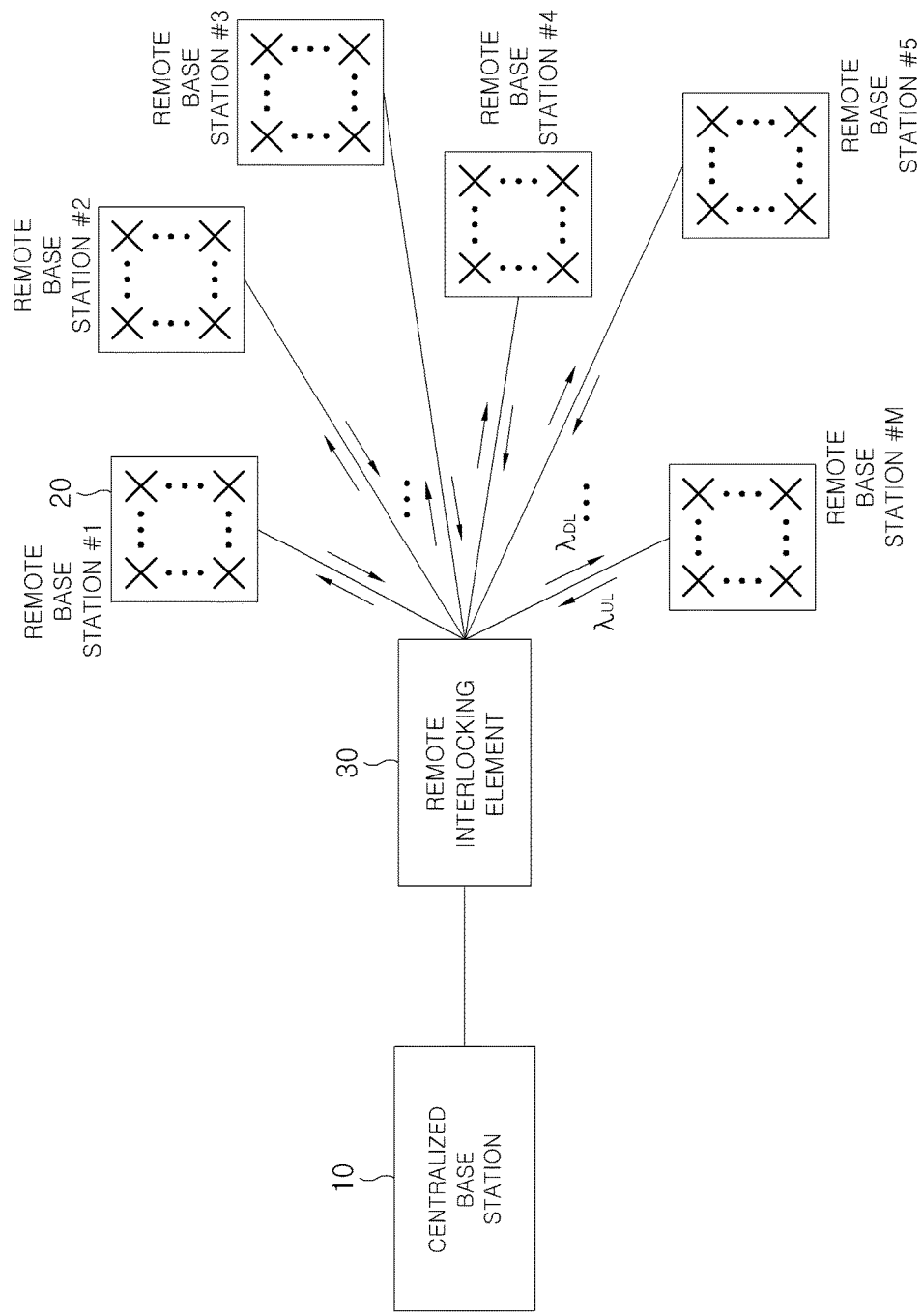
FIG. 6 is a configuration diagram of a system for managing a base station in a next generation mobile communication service according to still another exemplary embodiment.

FIG. 6 is a configuration diagram of a system for managing a base station in a next generation mobile communication service according to still another exemplary embodiment.

Referring to FIG. 6, the system for managing a base station in a next generation mobile communication service according to still another exemplary embodiment includes a centralized base station 10, a plurality of remote base stations 20, and a remote interlocking element 30. In the exemplary embodiment of FIG. 6, when the centralized base station 10 and the remote base stations 20 interlock with each other, the optical wavelength is allocated for each of uplink (UL) and downlink (DL).

The centralized base station 10 and the remote interlocking element 30 may be connected to each other through the optical cable or a UTP based Ethernet network.

The remote interlocking element 30 and the remote base station 20 are connected to each other through the optical cable. The centralized base station 10 selects the remote base station 20 to interlock with the user terminal and transmits the beamforming information of each remote base station 20 to the remote interlocking element 30 through an integrated frame.

The remote interlocking element 30 transmits the entirety of the integrated frame through a downlink optical wavelength $\lambda_{DL}$ and each remote base station 20 receives the corresponding information from an allocated subframe.

The information received from the user terminal is transmitted to the remote interlocking element 30 in an uplink optical wavelength $\lambda_{UL}$ through an uplink subframe allocated by each remote base station 20 and the remote interlocking element 30 transmits the received information to the centralized base station 10 through the integrated frame.

Since the function and the operation of the system for managing a base station in a next generation mobile communication service in FIG. 6 are substantially the same as those in FIG. 4, a repeated description thereof will be omitted.

Figure 7:
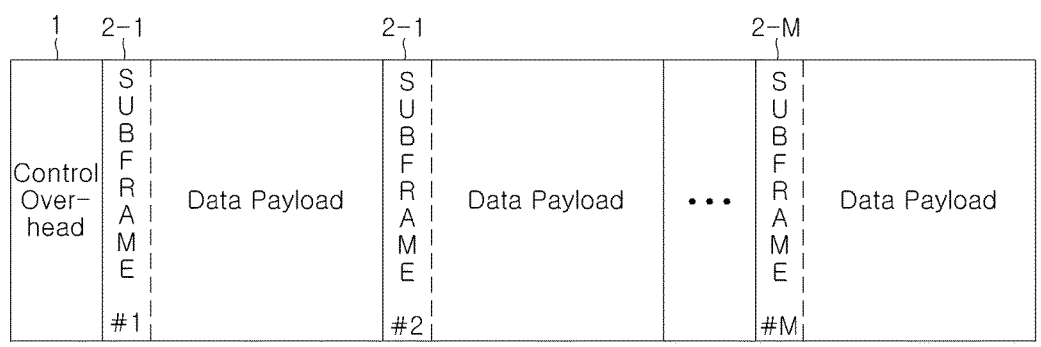
FIG. 7 illustrates an integrated frame structure for interlocking between a centralized base station and a remote base station according to an exemplary embodiment.

FIG. 7 illustrates an integrated frame structure for interlocking between a centralized base station and a remote base station according to an exemplary embodiment.

The centralized base station 10 transmits subframe numbers 2-1 to 2-M of respective remote base stations through a control overhead 1.

The remote base station 20 separates only information on the corresponding subframe from the transmitted integrated frame and beamforms control and data information in the corresponding subframe and transmits the beamformed control and data information to the user terminal.

Figure 8:
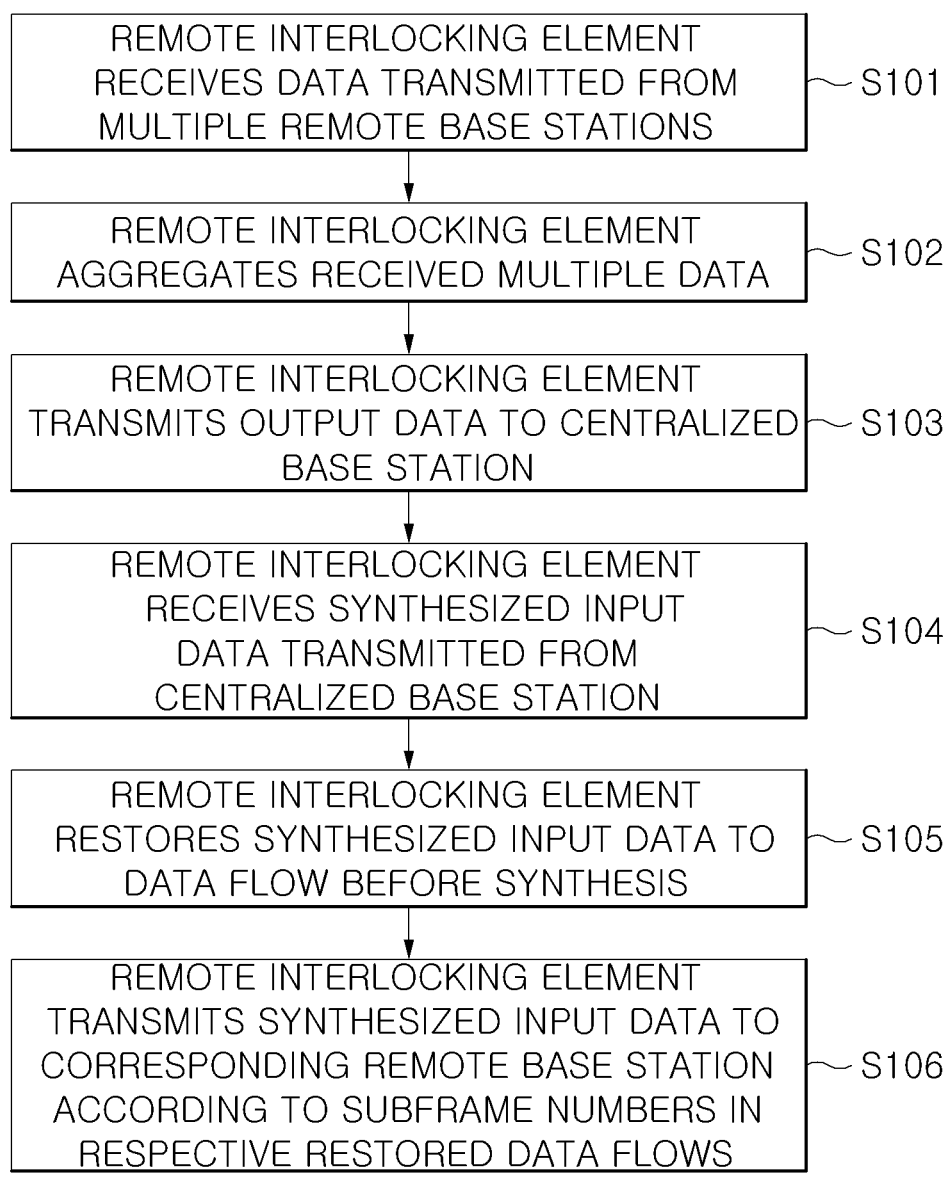
FIG. 8 is a flowchart of a method for managing a base station in the next generation mobile communication service according to an exemplary embodiment.

FIG. 8 is a flowchart of a method for managing a base station in the next generation mobile communication service according to an exemplary embodiment.

First, the remote interlocking element receives a plurality of data transmitted from a plurality of remote base stations (S101).

The remote interlocking element is connected to the plurality of remote base stations and the plurality of remote base stations may transmit data in the same time zone and the remote interlocking element receives a plurality of data transmitted in the same time zone as described above.

Next, the remote interlocking element receives and integrates the plurality of data transmitted from the plurality of remote base stations (S102).

In a process performed by the remote interlocking element, the plurality of data is received, subframe numbers for the respective received data are allocated, and the allocated subframe numbers are used and aggregated.

Thereafter, the remote interlocking element transmits output data to the centralized base station (S103).

The centralized base station may include a central interlocking element that executes a process in a manner opposite to a data processing procedure executed by the remote interlocking element. That is, the central interlocking element restores integrated data to a data flow before integration so that the centralized base station may the data flow before integration.

The remote interlocking element receives synthesized input data transmitted from the centralized base station (S104).

The remote interlocking element that receives the synthesized input data transmitted from the centralized base station restores the synthesized input data to a data flow before synthesis (S105).

The remote interlocking element may restore the synthesized input data to the data flow by extracting the subframe number from the synthesized input data received from the centralized base station and dividing the synthesized input data by the respective subframe numbers by referring to the extracted subframe numbers. In this manner, a corresponding remote base station to which data is to be transmitted is recognized.

Thereafter, the remote interlocking element transmits a plurality of data flows restored according to the subframe numbers in the respective restored data flows to the corresponding remote base station connected through the optical fiber (S106).

On the other hand, in another exemplary embodiment, when the remote interlocking element receives a flow of the synthesized input data transmitted from the centralized base station, the remote interlocking element may not restore the synthesized input data to the data flow before synthesis but instead transmit the synthesized input data to each remote base station, separate data of the corresponding subframe number from each remote base station, and receive the separated data.

According to an exemplary embodiment, a codebook may be used to interlock the remote base stations 20 with each other regardless of a network configuration.

When all of the remote base stations 20 are centralized in one place as illustrated in FIG. 1, in the case where a radio frequency (RF) chains of all antennas are used, a power gain of beamforming is enhanced. However, the codebook may not be used in a structure in which the remote base stations are distributed to a plurality of places as illustrated in FIG. 2.

When a dual codebook is used as a beamforming codebook of the remote base station 10 and an inter-base station interlocking codebook, integrated beamforming may be performed regardless of the network configuration.

An integrated beamforming codebook is expressed below by Equation 1.

$$C = C_C \otimes C_R \qquad \text{(Equation 1)}$$

Herein, $C_C$ represents an inter-remote base station interlocking codebook, $C_R$ represents the beamforming codebook of the remote base station, and ⊗ represents a Kronecker product symbol.

In an exemplary embodiment, it is assumed that the number of remote base stations is four and one remote base station is 2Tx 2Rx.

The codebook $C_R$ of the remote base station may adopt a 2×2 codebook of Equation 2 given below of a 3rd generation partnership project (3GPP) standard and the interlocking codebook $C_C$ may adopt a complex Hadamard matrix of Equation 3 given below.

$$C_C = \begin{pmatrix} 1 & 1 \\ 1 & e^{j\pi} \end{pmatrix} = \begin{pmatrix} 1 & 1 \\ 1 & -1 \end{pmatrix} \quad \text{(Equation 2)}$$

$$C_R = \frac{1}{2}\begin{pmatrix} 1 & 1 \\ j & -j \end{pmatrix} \quad \text{(Equation 3)}$$

$$C = \quad \text{(Equation 4)}$$

$$C_C \otimes C_R = \begin{pmatrix} 1 & 1 \\ 1 & -1 \end{pmatrix} \otimes \frac{1}{2}\begin{pmatrix} 1 & 1 \\ j & -j \end{pmatrix} = \frac{1}{2}\begin{pmatrix} 1 & 1 & 1 & 1 \\ j & -j & j & -j \\ 1 & 1 & -1 & -1 \\ j & -j & -j & j \end{pmatrix}$$

An integrated beamforming codebook matrix of Equation 4 given above may be used even when the remote base stations are centralized in one place as illustrated in FIG. 1 and a beamforming gain may be enhanced. Also, even when the remote base stations are installed at distributed places as illustrated in FIG. 2, the beamforming gain may be enhanced through the interlocking codebook.

The interlocking codebook may adopt unitary matrixes such as fast Fourier transform (FFT), discrete Fourier transform (DFT), and the complex Hadamard matrix or orthogonal matrices such as a Hadamard matrix and herein, there is a difference between both matrices in that in the unitary matrix, a component of a matrix is a complex number and in the orthogonal matrix, a component is a real number.

At least one of the components, elements, modules or units represented by a block as illustrated in the drawings may be embodied as various numbers of hardware, software and/or firmware structures that execute respective functions described above, according to an exemplary embodiment. For example, at least one of these components, elements or units may use a direct circuit structure, such as a memory, a processor, a logic circuit, a look-up table, etc. that may execute the respective functions through controls of one or more microprocessors or other control apparatuses. Also, at least one of these components, elements or units may be specifically embodied by a module, a program, or a part of code, which contains one or more executable instructions for performing specified logic functions, and executed by one or more microprocessors or other control apparatuses. Also, at least one of these components, elements or units may further include or implemented by a processor such as a central processing unit (CPU) that performs the respective functions, a microprocessor, or the like. Two or more of these components, elements or units may be combined into one single component, element or unit which performs all operations or functions of the combined two or more components, elements of units. Also, at least part of functions of at least one of these components, elements or units may be performed by another of these components, element or units. Further, although a bus is not illustrated in the above block diagrams, communication between the components, elements or units may be performed through the bus. Functional aspects of the above exemplary embodiments may be implemented in algorithms that execute on one or more processors. Furthermore, the components, elements or units represented by a block or processing steps may employ any number of related art techniques for electronics configuration, signal processing and/or control, data processing and the like.

The "unit" or "module" used herein may be a hardware component, such as a processor or a circuit, and/or a software component that is executed by a hardware component such as a processor.

According to exemplary embodiments, when a medium frequency and an ultra high frequency are utilized in a next generation mobile communication system, a maximum data rate can be acquired and coverage can be extended.

According to the exemplary embodiments, the same beamforming effect can be obtained regardless of a network configuration of a centralized base station and a remote base station.

While the disclosure has been described with respect to a few exemplary embodiments, it will be understood by those skilled in the art that various changes and modifications may be made without departing from the spirit and scope of the disclosure disclosed in the following claims.

What is claimed is:

1. A system for managing a base station in a next generation mobile communication service, the system comprising:
    a plurality of remote base stations configured to provide data transmission to a plurality of user terminals in a next generation mobile communication system;
    a centralized base station configured to perform interlocking among the plurality of remote base stations and perform resource allocation and scheduling for each user terminal; and
    a remote interlocking element configured to transmit corresponding control and data information to the plurality of remote base stations according to beamforming information and resource allocation information allocated by the centralized base station, and transmit channel information of a user terminal, which is received from the plurality of remote base stations, to the centralized base station,
    wherein the remote interlocking element receives at least two data flows transmitted from at least two remote base stations among the plurality of remote base stations, respectively allocates subframe numbers to the received at least two data flows, aggregates the received at least two data flows into one flow of output data based on the allocated subframe numbers, and transmits the output data to the centralized base station, the output data comprising the subframe numbers for indicating the at least two remote base stations that had transmitted the at least two data flows.

2. The system of claim 1, wherein the plurality of remote base stations are positioned at one place to accommodate the plurality of user terminals in one region.

3. The system of claim 1, wherein the plurality of remote base stations are positioned in a plurality of regions to extend coverage.

4. The system of claim 1, wherein,
    the remote interlocking element receives synthesized input data, which is a result of synthesis of at least two second data flows, from the centralized base station, restores the synthesized input data to the at least two second data flows, and transmits the restored the at least two second data flows to corresponding remote base stations according to subframe numbers in the respective restored data flows.

5. The system of claim 4, wherein the remote interlocking element restores the synthesized input data to the at least two data flows by extracting subframe numbers from the synthesized input data received from the centralized base station and dividing the synthesized input data into the at least two data flows based on the extracted subframe numbers.

6. The system of claim 1, wherein the centralized base station comprises a central interlocking element configured to receive output data, which is a result of synthesis of at least two first data flows, from the remote interlocking element and restore the output data to the at least two first data flows, and
wherein the central interlocking element is further configured to aggregate and synthesize at least two second data flows to be transmitted to at least two connected remote base stations and transmit aggregated and synthesized data to the remote interlocking element connected to the at least two connected remote base stations.

7. The system of claim 1, wherein each of the plurality of remote base stations comprises an optical element, the optical element being allocated with a unique optical wavelength and configured to transmit and/or receive a corresponding wavelength,
wherein the centralized base station comprises a multi-wavelength optical element configured to transmit signals of a plurality of wavelengths to transmit and/or receive control and data signals to and/or from the plurality of remote base stations, and
wherein, when the remote interlocking element receives the signals of the plurality of wavelengths from the multi-wavelength optical element, the remote interlocking element amplifies a signal of a wavelength corresponding to each remote base station, attenuates signals of remaining wavelengths, and transmits the signal to a corresponding remote base station.

8. The system of claim 7, wherein a wavelength of downlink from the centralized base station to the plurality of remote base stations is different from a wavelength of uplink from the plurality of remote base stations to the centralized base station.

9. The system of claim 1, wherein each of the plurality of remote base stations comprises an optical element, the optical element being allocated with a unique optical wavelength and configured to transmit and/or receive a corresponding wavelength, and
wherein the remote interlocking element comprises a multi-wavelength optical element configured to transmit and/or receive data in a wavelength corresponding to each remote base station to transmit and/or receive the control and data signals to and/or from the plurality of remote base stations.

10. The system of claim 9, wherein a wavelength of downlink from the remote interlocking element to the plurality of remote base stations is different from a wavelength of uplink from the plurality of remote base stations to the remote interlocking element.

11. The system of claim 1, wherein the plurality of remote base stations perform beamforming by using an integrated beamforming codebook based on a beamforming codebook and an inter-base station interlocking codebook.

12. The system of claim 10, wherein the plurality of remote base stations perform the beamforming by using the integrated beamforming codebook according to Equation 1 as below:

$$C = C_C \otimes C_R, \quad \text{(Equation 1)}$$

wherein $C_C$ represents an inter-remote base station interlocking codebook, $C_R$ represents the beamforming codebook of a remote base station, and $\otimes$ represents a Kronecker product symbol.

13. A method for managing a base station in a next generation mobile communication service, the method comprising operations:
(A) performing, by a centralized base station, interlocking among a plurality of remote base stations and performing resource allocation and scheduling for each user terminal;
(B) transmitting, by a remote interlocking element, corresponding control and data information to the plurality of remote base stations according to beamforming information and resource allocation information allocated by the centralized base station;
(C) providing, by the plurality of remote base stations, data transmission to a plurality of user terminals in a next generation mobile communication system according to the control and data information transmitted by the remote interlocking element; and
(D) transmitting, by the remote interlocking element, channel information of a user terminal, which is received from the plurality of remote base stations, to the centralized base station,
wherein step (D) includes:
(D-1) receiving, by the remote interlocking element, at least two data flows transmitted from at least two remote base stations among the plurality of remote base stations,
(D-2) respectively allocating subframe numbers to the received at least two data flows,
(D-3) aggregating, by the remote interlocking element, the received at least two data flows into one flow of output data based on the allocated subframe numbers, and
(D-4) transmitting, by the remote interlocking element, the output data to the centralized base station, the output data comprising the subframe numbers for indicating the at least two remote base stations that had transmitted the at least two data flows.

14. The method of claim 13, wherein the plurality of remote base stations are positioned at one place to accommodate the plurality of user terminals in one region.

15. The method of claim 13, wherein the plurality of remote base stations are positioned in a plurality of regions to extend coverage.

16. The method of claim 13, wherein in operation (A), the centralized base station performs interlocking with the plurality of remote base stations by using signals of a plurality of wavelengths to transmit and/or receive control and data signals to and/or from the plurality of remote base stations, and
wherein, in operation (B), when the remote interlocking element receives the signals of the plurality of wavelengths from a multi-wavelength optical element of the remote interlocking element, the remote interlocking element amplifies a signal of a wavelength corresponding to each remote base station, attenuates signals of remaining wavelengths, and transmits the corresponding control and data information to a corresponding remote base station.

17. The method of claim 13, wherein in operation (B), the remote interlocking element transmits and/or receives control and data signals to and/or from the plurality of remote base stations in a wavelength corresponding to each remote base station.

18. The method of claim 13, wherein the plurality of remote base stations perform beamforming by using an integrated beamforming codebook based on a beamforming codebook and an inter-base station interlocking codebook.

19. The method of claim 18, wherein the plurality of remote base stations perform the beamforming by using the integrated beamforming codebook according to Equation 1 as below:

$$C = C_C \otimes C_R, \quad \text{(Equation 1)}$$

wherein $C_C$ represents an inter-remote base station interlocking codebook, $C_R$ represents the beamforming codebook of a remote base station, and $\otimes$ represents a Kronecker product symbol.

20. The method of claim 13, wherein step (B) includes:
(B-1) receiving, by the remote interlocking element, synthesized input data transmitted from the centralized base station,
(B-2) restoring, by the remote interlocking element, the synthesized input data to at least two data flows before synthesis, and
(B-3) transmitting, by the remote interlocking element, the restored at least two data flows to corresponding remote base stations according to subframe numbers in the restored at least two data flows.

21. The method of claim 20, wherein step (B-2) includes:
(B-2a) extracting, by the remote interlocking element, subframe numbers from the synthesized input data received from the centralized base station, and
(B-2b) dividing, by the remote interlocking element, the synthesized input data into the at least two data flows based on the extracted subframe numbers.

* * * * *